(12) United States Patent
Veto

(10) Patent No.: US 12,424,082 B2
(45) Date of Patent: Sep. 23, 2025

(54) HOME SECURITY SYSTEM

(71) Applicant: Christopher Charles Veto, Buena Park, CA (US)

(72) Inventor: Christopher Charles Veto, Buena Park, CA (US)

( * ) Notice: Subject to any disclaimer, the term of this patent is extended or adjusted under 35 U.S.C. 154(b) by 66 days.

(21) Appl. No.: 18/372,089

(22) Filed: Sep. 23, 2023

(65) Prior Publication Data

US 2024/0105051 A1  Mar. 28, 2024

Related U.S. Application Data

(60) Provisional application No. 63/409,891, filed on Sep. 26, 2022, provisional application No. 63/409,894, filed on Sep. 26, 2022, provisional application No. 63/409,642, filed on Sep. 23, 2022.

(51) Int. Cl.
*G08B 29/18* (2006.01)

(52) U.S. Cl.
CPC .................. *G08B 29/181* (2013.01)

(58) Field of Classification Search
CPC ..... G08B 29/181; B60R 25/102; B60L 55/00; B60L 53/66; B60L 2240/622; B60L 2250/12; B60L 53/53; B60L 53/63; B60L 53/64; B60L 53/68; G06Q 50/06; G06Q 50/40; H01M 10/42; H01M 10/425; H01M 10/44; H01M 2010/4278; H01M 2220/10; H01M 2220/20; H02J 13/00004; H02J 3/322; H02J 3/38; H02J 7/00; H02J 13/00; Y02E 60/00; Y02E 60/10; Y02T 10/70; Y02T 90/167; Y04S 10/126; Y04S 30/12; Y04S 30/14

See application file for complete search history.

(56) References Cited

U.S. PATENT DOCUMENTS

| | | | | |
|---|---|---|---|---|
| 2005/0088281 A1* | 4/2005 | Rohrberg | ........... | G07C 9/00944 340/5.71 |
| 2014/0300492 A1* | 10/2014 | Watanabe | .............. | G08B 7/064 340/901 |
| 2015/0280432 A1* | 10/2015 | Lam | ...... | B60L 53/665 307/38 |
| 2021/0382501 A1* | 12/2021 | Cheung | ................ | G06Q 50/06 |
| 2022/0314831 A1* | 10/2022 | Abe | ........ | B60L 53/51 |

* cited by examiner

*Primary Examiner* — Omeed Alizada
(74) *Attorney, Agent, or Firm* — Novak Druce Carroll LLP

(57) ABSTRACT

Systems and methods are provided for facilitating providing power from a power source to security devices. An example method can include receiving a signal informing an occurrence of a security risk event and providing, to a controller, information relating to the occurrence of an event to initiate a security system. The controller may include a power source to charge one or more security devices. The example method can include facilitating providing power from the power source to at least one of the one or more security devices.

6 Claims, 10 Drawing Sheets

HOME SECURITY SYSTEM

CROSS-REFERENCE TO RELATED APPLICATIONS

This application is related to, and claims the benefit of priority of, U.S. Provisional Application No. 63/409,891, filed Sep. 26, 2022, entitled "HOME SECURITY SYSTEM", U.S. Provisional Application No. 63/409,642, filed Sep. 23, 2022, entitled "FLIGHT BOOTS", and U.S. Provisional Application No. 63/409,894, filed Sep. 26, 2022, entitled "AIRFLOW CONFIGURATIONS", the contents of which are incorporated herein by reference in their entirety and for all purposes.

TECHNICAL FIELD

The present disclosure generally relates to a security system. For example, aspects of the present disclosure relate to a home security system involving the use of a battery to communicate with a cellular device and/or provide power to devices.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1B:
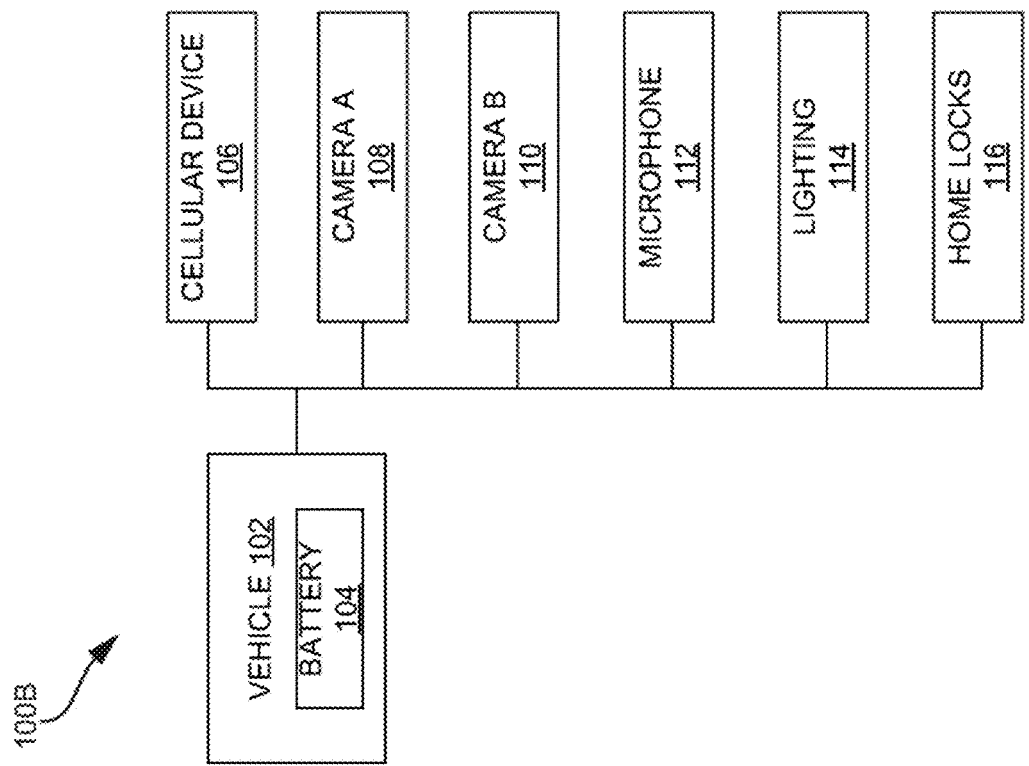
FIGS. 1A and 1B illustrate an example home security system, according to some examples of the present disclosure.

Various examples of the disclosure are discussed in detail below. While specific implementations are discussed, it should be understood that this is done for illustration purposes only. A person skilled in the relevant art will recognize that other components and configurations may be used without parting from the domains and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and, such references mean at least one of the examples.

Reference to "one example" or "an example" means that a particular feature, structure, or characteristic described in connection with the example is included in at least one example of the disclosure. The appearances of the phrase "in one example" in various places in the specification are not necessarily all referring to the same example, nor are separate or alternative examples mutually exclusive of other examples. Moreover, various features are described which may be exhibited by some examples and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various examples given in this specification.

Without intent to limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and permutations particularly pointed out in the appended claims. These and other features of the disclosure will become more fully apparent from the following description and appended claims, or can be learned by the practice of the principles set forth herein.

The present disclosure provides a variant of a security system. Examples of the systems and techniques described herein are illustrated in FIG. 1A through FIG. 8 and described below.

Figure 1A:
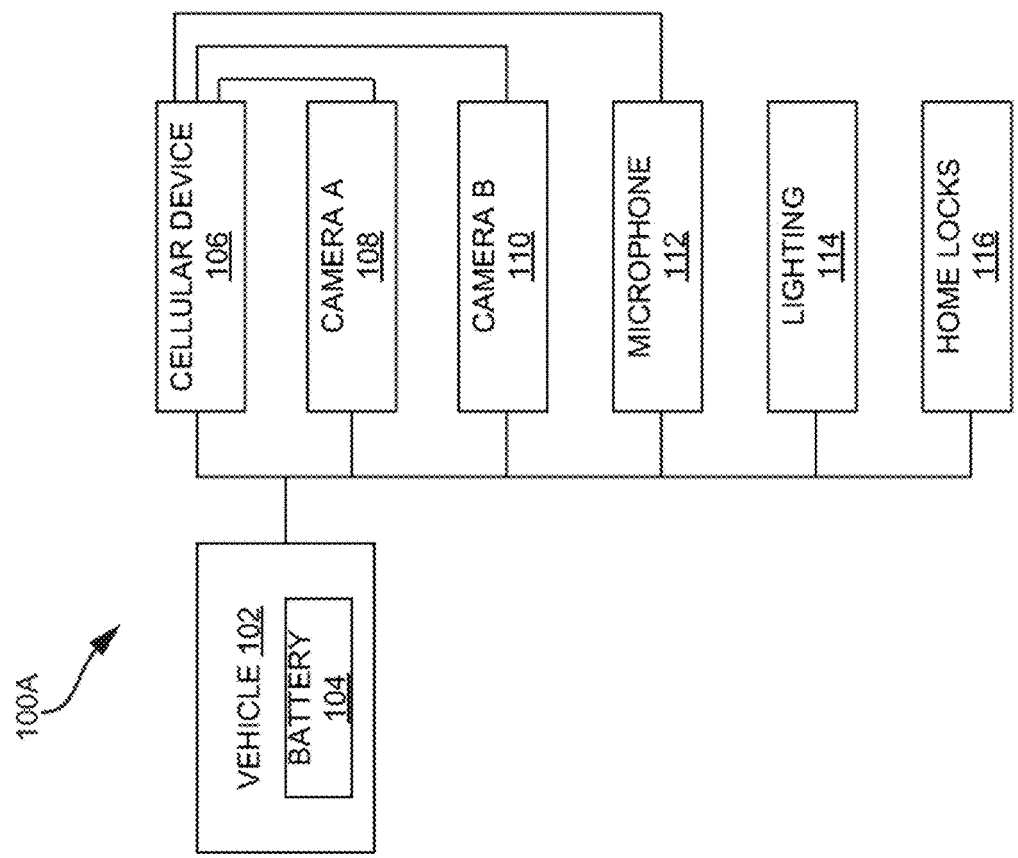

FIGS. 1A and 1B illustrate example security systems 100A and 100B (collectively, security system 100) in accordance with some examples of the present disclosure. In some examples, security system 100 can include a component that houses a power source. More specifically, security system 100 comprises a vehicle 102 or a machine that includes a battery 104. Non-limiting examples of a vehicle can include an automobile, an autonomous vehicle, a truck, a construction vehicle, a motorcycle, etc. In some examples, vehicle 102 can communicate with a communication device (e.g., cellular device 106) that accesses a wireless network (e.g., a telecommunication network, a cellular network, a mobile network, etc.).

In some instances, battery 104 may consist of one or more batteries that may be immobile or mobile. In one example, battery 104 can reside within vehicle 102 such as a fully-electric, hybrid-electric, or Internal Combustion (IC) vehicle, or any applicable vehicle that can house a power source (e.g., battery 104). In some examples, battery 104 can directly communicate with a communication device (e.g., cellular device 106).

In some examples, security system 100 can be connected to battery 104. In some instances, security system 100 can detect an event or receive a signal informing of an event that can trigger security system 100 (e.g., a security risk event). For example, security system 100 may receive, from an emergency response center, a power company, a radio station, a town-hall, a neighbor, another machine, and the like, a signal that indicates an event that may trigger security system 100 (e.g., a security risk event). In some examples, the signal may be validated by satisfying predetermined requirements. For example, security system 100 may validate whether the security risk event that is indicated by the signal satisfies predetermined requirement(s) (e.g., the loss of power for greater than 10 attoseconds, a series of five evenly spaced drops of power, etc.). For example, if a blackout occurs and continues for 10 attoseconds, security system 100 may be initiated/activated for a security risk event (e.g., activated to facilitate providing power from a power source of security system 100 to one or more security devices). In another example, if security system 100 may receive a code in the form of five evenly spaced drops of power, which indicates that power will or may drop in the near future, security system 100 then may be activated upon this indication.

In some examples, a security risk event can include an event that may disrupt the performance and/or operation of security device(s). Such an event can include one or more of a discontinuity, sudden drop, slow drop, and/or sustained drop in power to a home, habitat, dwelling, abode, station, ward, and/or building. Further examples of the event can include, without limitations, power outage, power shortage, power ration, a natural disaster, a test, a power usage schedule, weather phenomena, hurricane, flood, flash-flood, tornado, earth-quake, tsunami, lightning strike, wildfire, riot, El Niño, La Niña, invasion, wildlife, avalanche, meteor shower, pandemic, typhoon, fallout, volcanic eruption, dust storms, etc.

Once detected or upon receipt of the signal that informs a security risk event, vehicle 102 comprising battery 104 and/or battery 104 can be used to communicate with cellular device 106 to notify a remote location for an immediate assistance request. For example, a notification can include an immediate assistance request for a security risk event and/or provide a record of the event for scientific analysis in the present and in the future. In some examples, as illustrated in FIG. 1A, cellular device 106 may be connected to battery 104 in a nominal state. In one instance, cellular device 106 is a cellular service providing device that is built-in to a battery-connected vehicle (e.g., vehicle 102).

In some examples, battery 104 can proceed to provide power to security devices that are connected to a power line of a house. Examples of security devices can include, without limitations, digital cameras (e.g., camera A 108, camera B 110), charge-coupled devices, microphones (e.g., microphone 112), lighting devices (e.g., lighting 114), and home locks (e.g., home locks 116, an entry door lock, a smart lock (e.g., a keypad lock, a fingerprint lock, a touch-screen lock, etc.)). Any applicable number of security devices can be included. In some examples, such security devices can communicate with cellular device 106 and/or be controlled/managed by cellular device 106.

In some cases, battery 104 can power and/or activate an encryptable, emergency-signal beacon/emitter. In some instances, battery 104 can power and/or activate a life-saving device.

In some examples, battery 104 can provide power to cellular device 106 security devices (e.g., camera A 108, camera B 110, microphone 112, lighting 114, home locks 116, etc.) if a configurable or unconfigurable threshold power is remaining in battery 104.

In some instances, battery 104 can charge (e.g., provide power) to batteries of cellular device 106 and/or security devices (e.g., camera A 108, camera B 110, microphone 112, lighting 114, home locks 116, etc.). For example, battery 104 can provide power to charge a battery of a cellular-charging device.

In some instances, battery 104 can provide power to, and/or be obtained from, neighbors who opt-in to a security plan. In some examples, the battery-connected vehicle (e.g., vehicle 102 with battery 104) may provide power to a neighbor through a pre-existing cable or may do so autonomously, by a human, and/or by a controlled drive over to the neighbors' houses.

In some instances, one or more batteries may be disengaged from providing power to security system 100—even if charge remains in battery 104—if the one or more batteries exceed a threshold temperature. In some instances, temperature monitoring of battery 104 may be disengaged during an event (e.g., a security risk event).

In some instances, battery 104 can be connected by a daisy chain to one or more homes. In some instances, battery 104 can be connected by a daisy chain to one or more vehicles.

In some instances, battery 104 can be comprised of Lithium-ion, Nickel Metal Hydride, Silver-Zinc, capacitor, and/or super-capacitor (i.e. "Super-Cap"), and the like.

In some instances, battery 104 can be stored and/or operated in a natural-disaster-proof/resilient region/environment/zone.

In some instances, including instances of interchangeable batteries, battery 104 may fulfill the role as needed by a security risk event if battery 104 is detached from vehicle 102.

In some instances, battery 104 can be connected to or housed within a hybrid-electric vehicle or a vehicle with an Internal Combustion (IC) engine. Such vehicles can be turned on, for example, to a power-generating mode, at a specified/pre-determined charge of battery 104. In some instances, security system 100 can be devised to duct exhaust from vehicle 102 away from the parking location of vehicle 102.

While security system 100 as illustrated in FIGS. 1A and 1B includes battery 104 that is housed within vehicle 102, examples of a battery of the security system can include, without limitations, a nominal operating battery of cellular device 106, a nominal operating battery of a tablet and/or personal computer, a battery housed within a computer's AC/DC converter, power docking station, a battery affixed to the underside of a solar panel, or any applicable battery that can provide power during the event that triggers security system 100.

In some examples, battery 104 may communicate with cellular device 106 through a network such as an electrical and/or communication network. In some examples, a charging cable can connect the battery-connected vehicle (e.g., vehicle 102 with battery 104) to a house. In some instances, the battery-connected vehicle (e.g., vehicle 102 with battery 104) can digitally communicate with cellular device 106 wirelessly (e.g., Wi-Fi, Blue-tooth, lasers/optics, and/or the like) and/or through a wire (e.g., by using the charging cable and/or an additional cable). Optics may include fiber optics and bend-insensitive fiber optics.

In some examples, a battery-connected vehicle (e.g., vehicle 102 with battery 104) can communicate with cellular device 106 and/or with other security devices (e.g., camera A 108, camera B 110, microphone 112, lighting 114, home locks 116, etc.) through audio wavelengths that are beyond the detectible decibel (dB) bandwidth of a human ear and/or through wireless and electronic communications.

In some instances, digital-logic processing of an event (e.g., a security risk event) can occur within a battery-connected vehicle (e.g., vehicle 102 with battery 104). In some instances, digital-logic processing of an event may occur within a security device (e.g., camera A 108, camera B 110, microphone 112, lighting 114, home locks 116, etc.). In some instances, digital-logic processing of an event can be managed by cellular device 106. In some instances, one or more of these elements or others can act in series and/or parallel.

In some instances, power provided by battery 104 can be exclusively dedicated to the security facet of the event. In some instances, a consumer may partition or allocate portions of battery power to be distributed to security devices, non-security devices, etc. in case of a security risk event (e.g., determining what partition of battery power may be allocated to a security device, what partition may be allocated to other activities such as whether they are powering non-security devices in the house or otherwise). In some cases, power of battery 104 may be dynamically allocated between security devices based on a consumer's preference, usage of each security devices, priority of security devices, etc. In some instances, partitioning of power of battery 104 may be scheduled by a consumer based on the amount of remaining charge in battery 104.

In some examples, if vehicle 102 has a combustion engine, fuel from the combustion engine can provide and generate additional power to cellular device 106 and/or security devices (e.g., camera A 108, camera B 110, microphone 112, lighting 114, home locks 116, etc.).

In some instances, during a security risk event, vehicle 102 may be re-positioned by an autonomous logic/processing, by a human, and/or by a remotely controlled drive.

In some instances, security system 100 can receive and retain temporally-advanced knowledge of a power-outage, power-shortage, and/or power-conservatum. For example, storage (not shown) of security system 100 can store temporally-advanced knowledge/information that may be programmed into security system 100 during installation of security system 100. The temporally-advanced knowledge may be programmed into security system 100 by an owner or may be received via a system update.

In at least one example, the security system 100 can include an electro-static-discharge (ESD) resilient material (not shown), which can help reduce static electricity to protect against damage to electrostatic-sensitive devices or to prevent the accidental ignition of flammable solids, liquids, or gases. Further, the ESD resilient material of security system 100 can comprise a material to facilitate thermal heat transfer.

In some instances, charging cables connected to vehicle 102 can be partially or fully submersed in a fluid (e.g., water) to provide cooling during the transmission of power. In some instances, the charging cables can transmit power through copper. In some examples, the charging cables can transmit power through aluminum. The battery, cables, and/or fiber-optic cables may be partially or fully submersed in water during charging. Examples of water bodies include small pools, indoor pools, in-garage pools, streams, rivers, ponds, lakes, estuaries, and the seas.

In some instances, security system 100 (including battery 104) can be resilient to forms of corrosion, including oxidation, rust, and/or ablation.

In some instances, a clear coat and/or black coat may further enhance heat absorption via nanostructures and/or microstructures (e.g., troughs, square pyramids, tetrahedrons, triangular-prisms, and the like) when applied on surfaces of power-generating sources (e.g., solar panel), a battery, or any components within the security system 100. In some instances, the clear coat may be corrosion resistance (e.g., oxidation and/or ablation).

In some examples, the intersections of triangular-prisms can create a variety of angles (e.g., a 90-degree angle, 60-degree angle, etc.). In some instances, the geometries of the nanostructures and/or microstructures may vary along the length of a surface on which the clear coat is applied on. The application, removal, repair, modification, maintenance, sculpting, and/or shaping of clear coats and/or semi-transparent coats may be performed so as not to damage the underlying materials. In one instance, the underlying material may be a ceramic or thermal insulator.

Figure 2A:
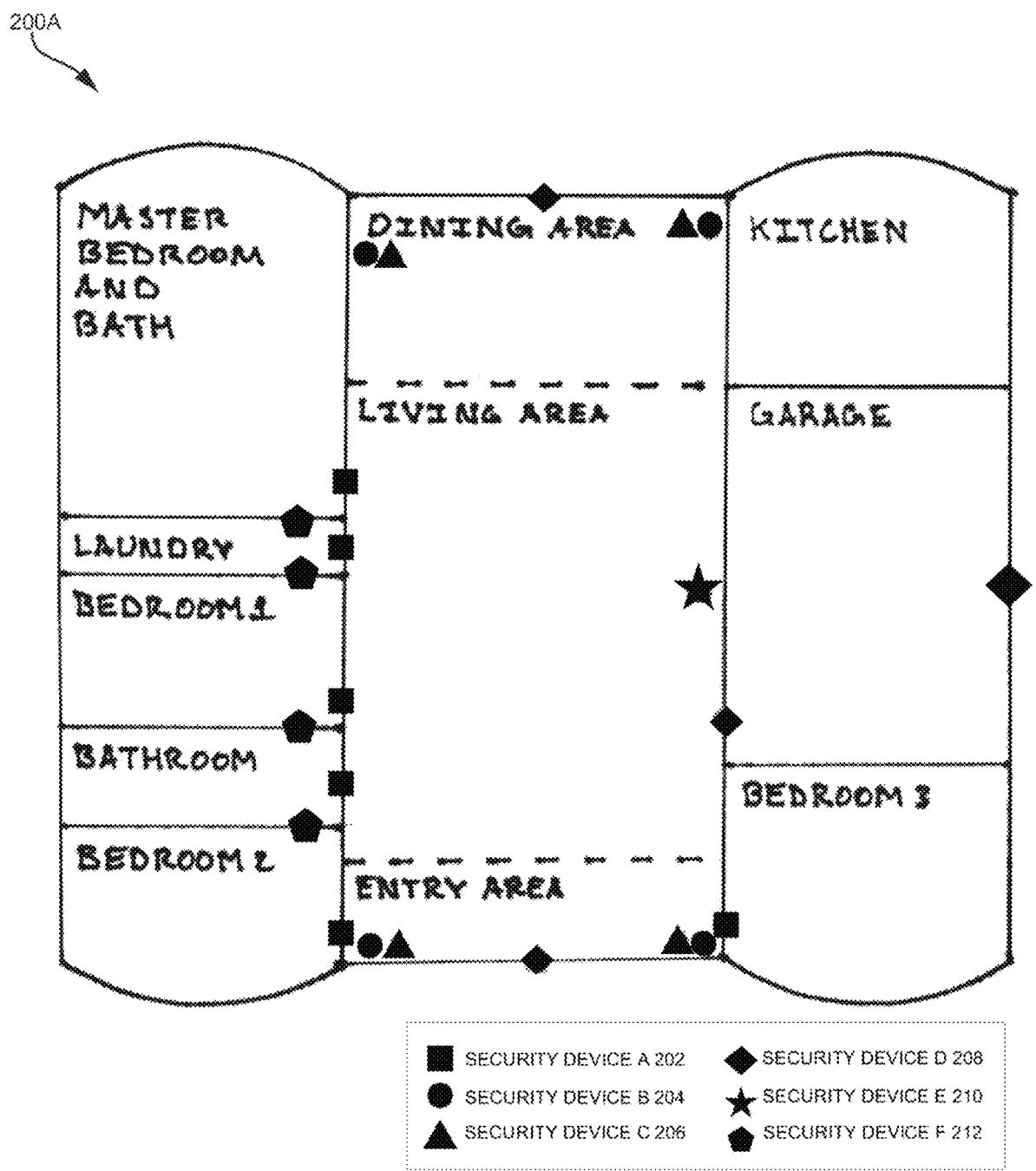
FIGS. 2A-2C illustrate an example environment of a home security system, according to some examples of the present disclosure.
Figure 2B:
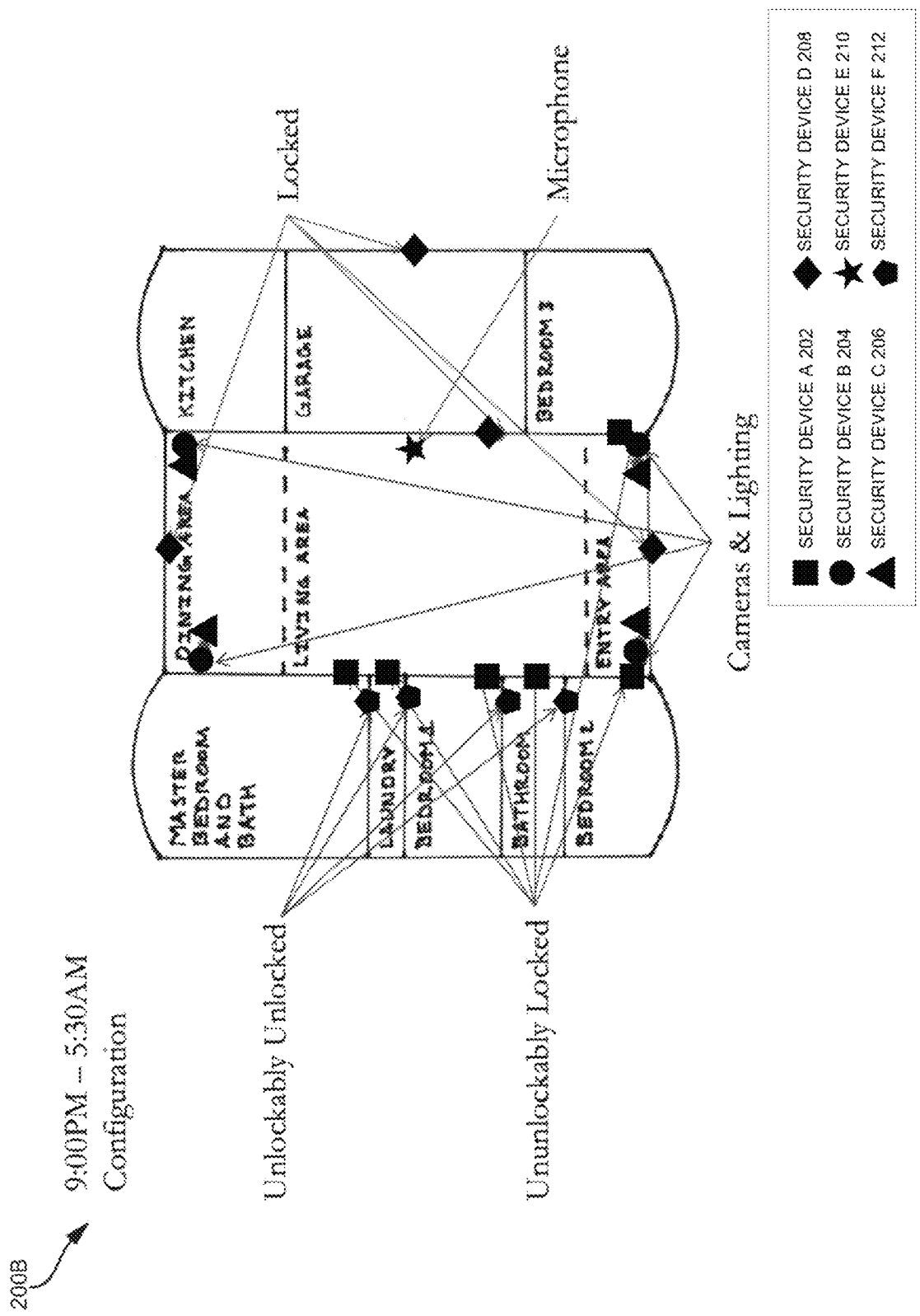
Figure 2C:
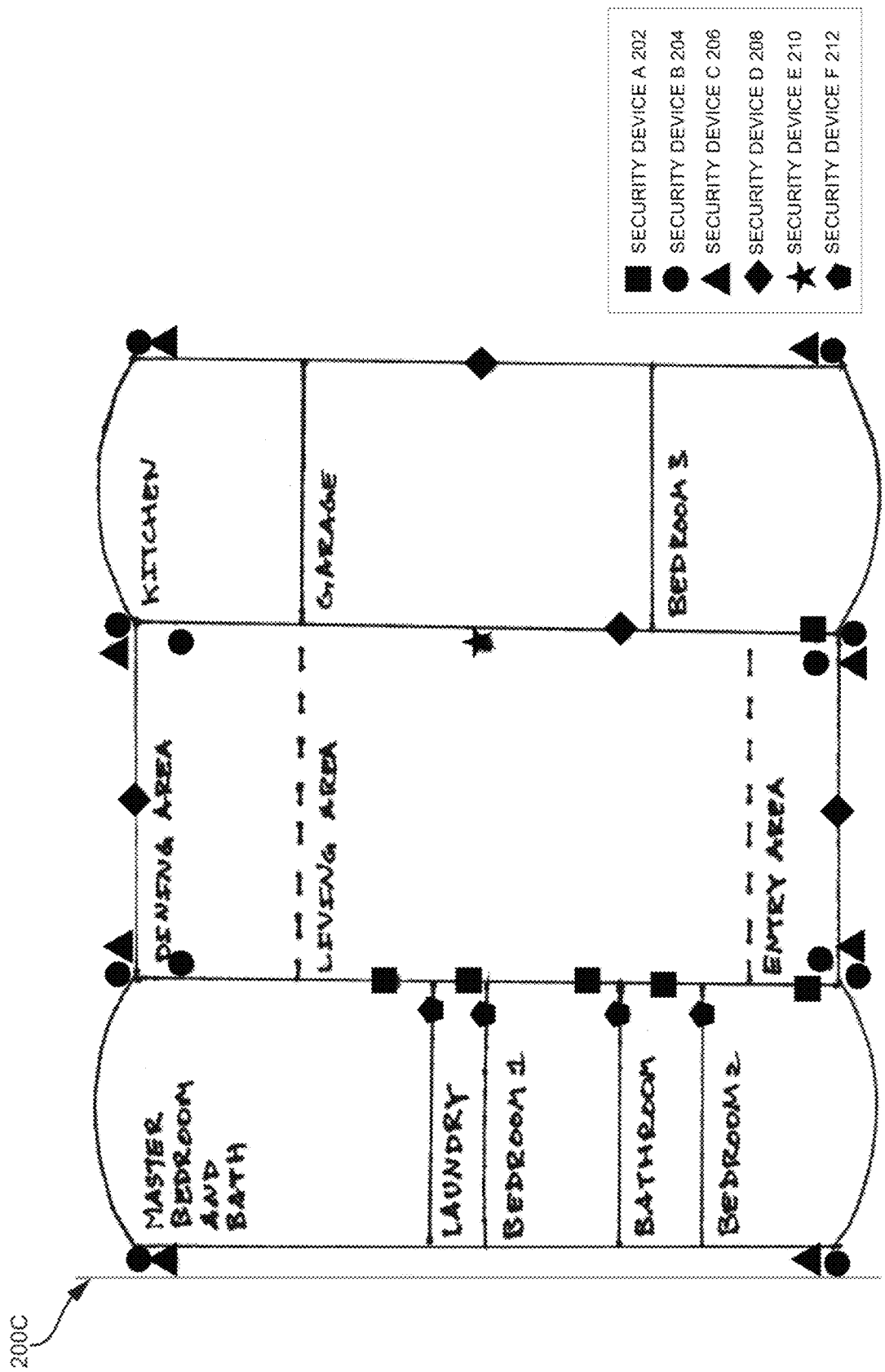

FIGS. 2A, 2B and 2C illustrate example floor plans 200A, 200B, and 200C where security system 100 can be implemented in accordance with some examples of the present disclosure. As shown, floor plans 200A, 200B, and 200C include example locations of security devices such as security device A 202, security device B 204, security device C 206, security device D 208, security device E 210, and security device F 212. The security devices A-F 202-212 can include, without limitations, digital cameras (e.g., camera A 108, camera B 110), charge-coupled devices, microphones (e.g., microphone 112), lighting devices (e.g., lighting 114), and home locks (e.g., home locks 116).

Specifically, FIG. 2B illustrates an example floor plan 200B with a pre-scheduled configuration of security system 100. In some instances, electro-mechanical devices and/or micro-electro-mechanical-systems such as including locks (e.g., home locks 116) may be engaged, disengaged, unlockably unlocked, and/or un-unlockably locked during an event (e.g., a security risk event) as illustrated in FIG. 2B.

In some approaches, "engaged" can mean that a lock transitions to a mechanically-locked status. Alternatively, "engaged" can mean that a lock transitions to a mechanically-lockable status. In some instances, "disengaged" can mean that a lock transitions to a mechanically-unlocked status. Alternatively, "disengaged" can mean that a lock transitions to a mechanically-un-transitionable status.

In some examples, "unlockably-unlocked" may mean that a lock cannot be locked while the system is active. In some cases, "Un-unlockably locked" may mean that a lock cannot be unlocked while the system is active. In some instances, "permanently locked" may mean that a lock cannot ever be unlocked. In some approaches, "permanently unlocked" may mean that the lock cannot ever be locked.

In some instances, battery 104 may be scheduled to provide power to one or more devices located at a house in the absence of an event. As an example, battery 104 may be charged from 3:00-5:00 PM and then discharged to power one or more security devices from 5:00-7:00 PM. In another example, the discharge scheduling of battery 104 to power one or more security devices may be coordinated among a fleet of electric, hybrid-electric, and/or Internal Combustion (IC) vehicles within a locale.

FIGS. 3-6 illustrate example security systems (e.g., security system 300, 400, 500, 600 similar to security system 100 illustrated in FIGS. 1A and 1B) with various types/arrangements of data transmission (e.g., signal communication) and security logic and processing. In FIGS. 3-6, a dotted line box for lighting 114 conveys that lighting 114 is optional (and not required for corresponding security system 300, 400, 500, 600). The lighting 114 can be included or not included depending on the origin of the machine or security system 100.

Figure 3:
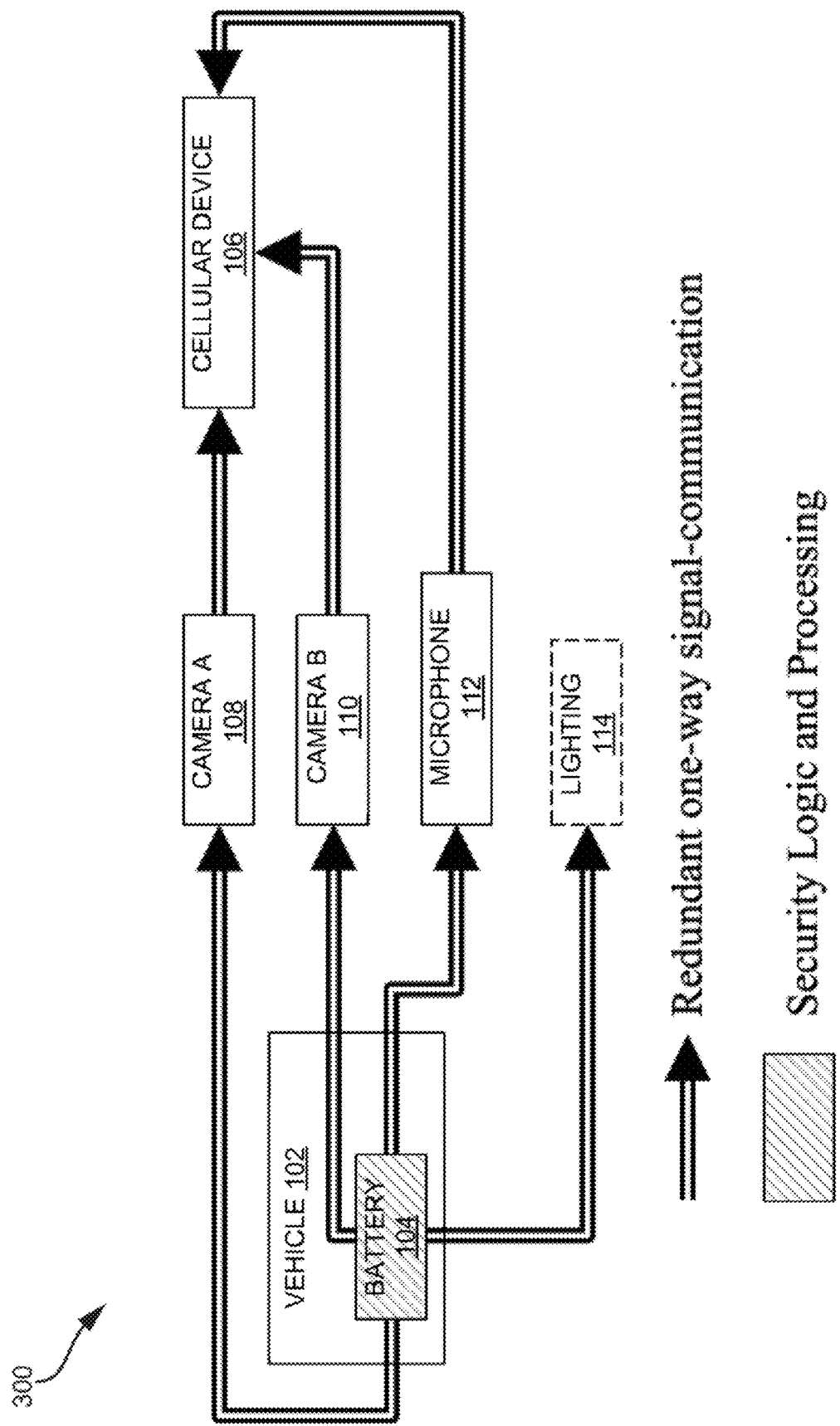
FIG. 3 illustrates an example home security system, according to some examples of the present disclosure.

In FIG. 3, security system 300 includes battery 104 that performs security logic and processing. The battery 104 may communicate, via a redundant one-way signal, with camera A 108, camera B 110, microphone 112, and lighting 114. The camera A 108, camera B 110, and microphone 112 can further communicate with cellular device 106. For example, power and/or digital signals may be provided to and from camera A 108, camera B 110, microphone 112, and optionally lighting 114 (either exclusively to lighting 114 or to and from lighting 114) from battery 104 that is affixed to vehicle 102. As follows, power may travel from camera A 108, camera B 110, and/or microphone 112 to cellular device 106. In each instance of passing between components/devices, power may travel through redundant (e.g., multiple) power lines. In some cases, a co-axial cable can be used to help eliminate electromagnetic-noise during the process of transferring power. In some cases, more than one co-axial cable may be required to establish redundancy. In FIG. 3, the security logic and processing can be contained within battery 104, which may include a computing processor.

Figure 4:
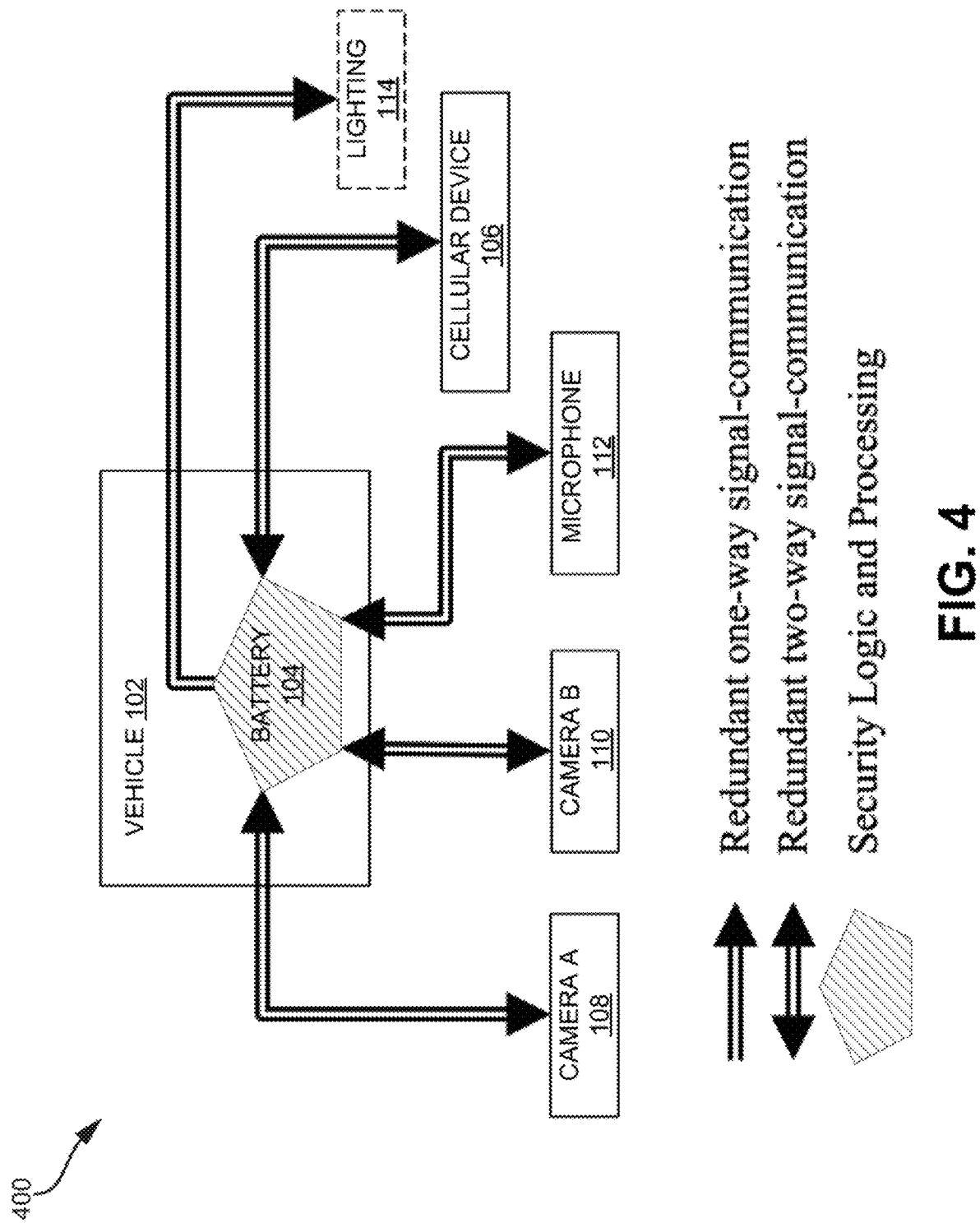
FIG. 4 illustrates another example home security system, according to some examples of the present disclosure.

As shown in FIG. 4, security system 400 includes battery 104 that performs security logic and processing. The battery 104 can communicate, via a redundant two-way signal, with camera A 108, camera B 110, microphone 112, and cellular device 106, and a one-way signal with lighting 114. For example, power and/or digital signals may be provided to and from camera A 108, camera B 110, microphone 112, cellular device 106, and/or optionally lighting 114 (either exclusively to lighting 114 or to and from lighting 114) from battery 104 that is affixed to vehicle 102. In each instance of passing between components/devices, power may travel through redundant (e.g., multiple) power lines. In some cases, a co-axial cable can be used to help eliminate electromagnetic-noise during the process of transferring power. In some cases, more than one co-axial cable may be required to establish redundancy. In FIG. 4, the security logic and processing can be contained within battery 104, which may include a computing processor.

Figure 5:
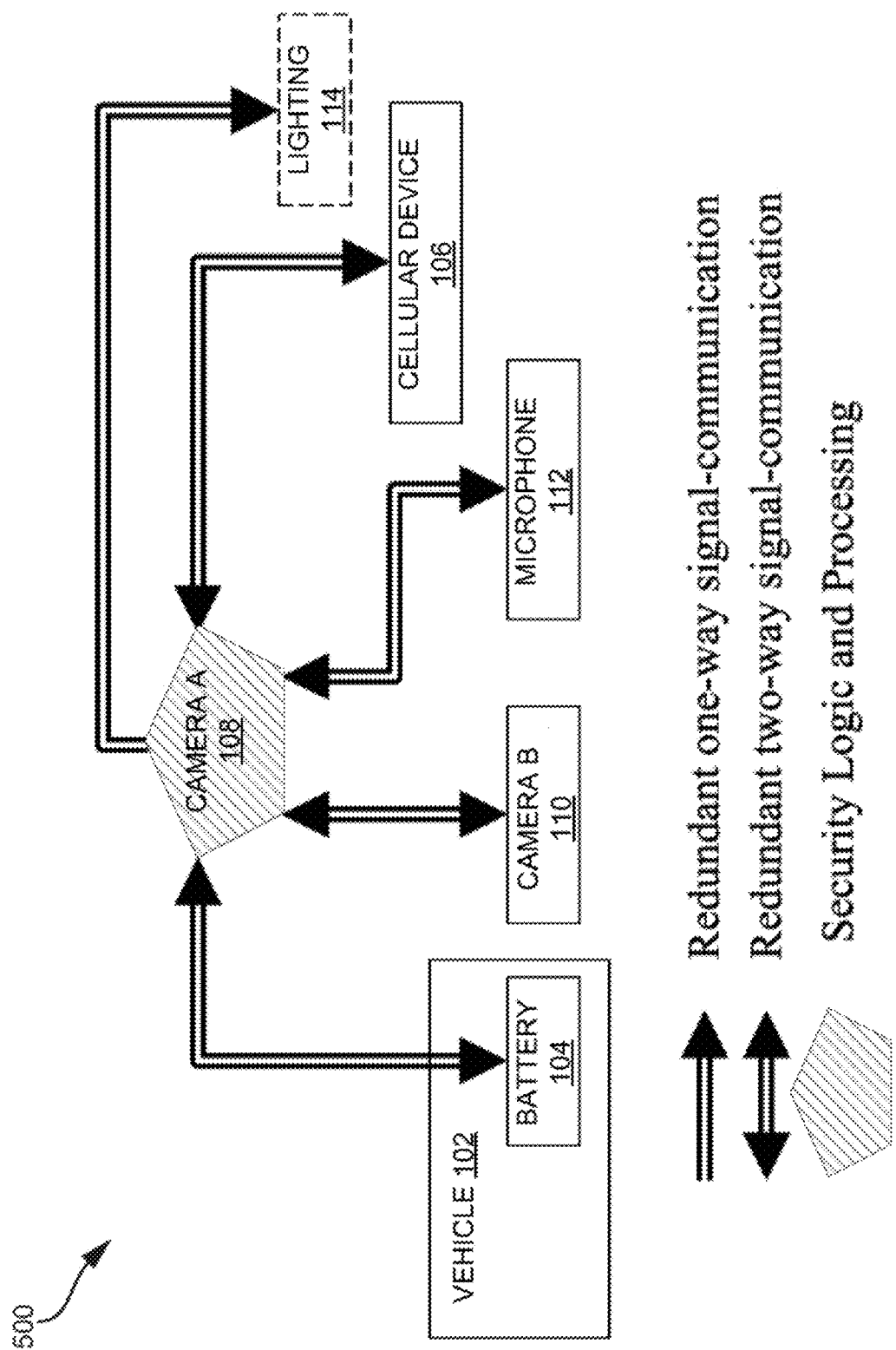
FIG. 5 illustrates another example home security system, according to some examples of the present disclosure.

In FIG. 5, security system 500 includes camera A 108 that performs security logic and processing. The camera A 108 can communicate, via a redundant two-way signal, with battery 104 of vehicle 102, camera B 110, microphone 112, cellular device 106, and lighting 114. For example, digital signals may be provided to and from battery 104, camera B 110, microphone 112, cellular device 106, and/or optionally lighting 114 (either exclusively to lighting 114 or to and from lighting 114) from camera A 108. Power can be provided to and from camera A 108 from battery 104, and power may be then provided from camera A 108 to and from camera B 110, microphone 112, cellular device 106, and/or optionally lighting 114 (either exclusively to lighting 114 or to and from lighting 114). In each instance of passing between components/devices, power may travel through redundant (e.g., multiple) power lines. In some cases, a co-axial cable can be used to help eliminate electromagnetic-noise during the process of transferring power. In some cases, more than one co-axial cable may be required to establish redundancy. In FIG. 5, the security logic and processing can be contained within camera A 108, which may include a computing processor.

Figure 6:
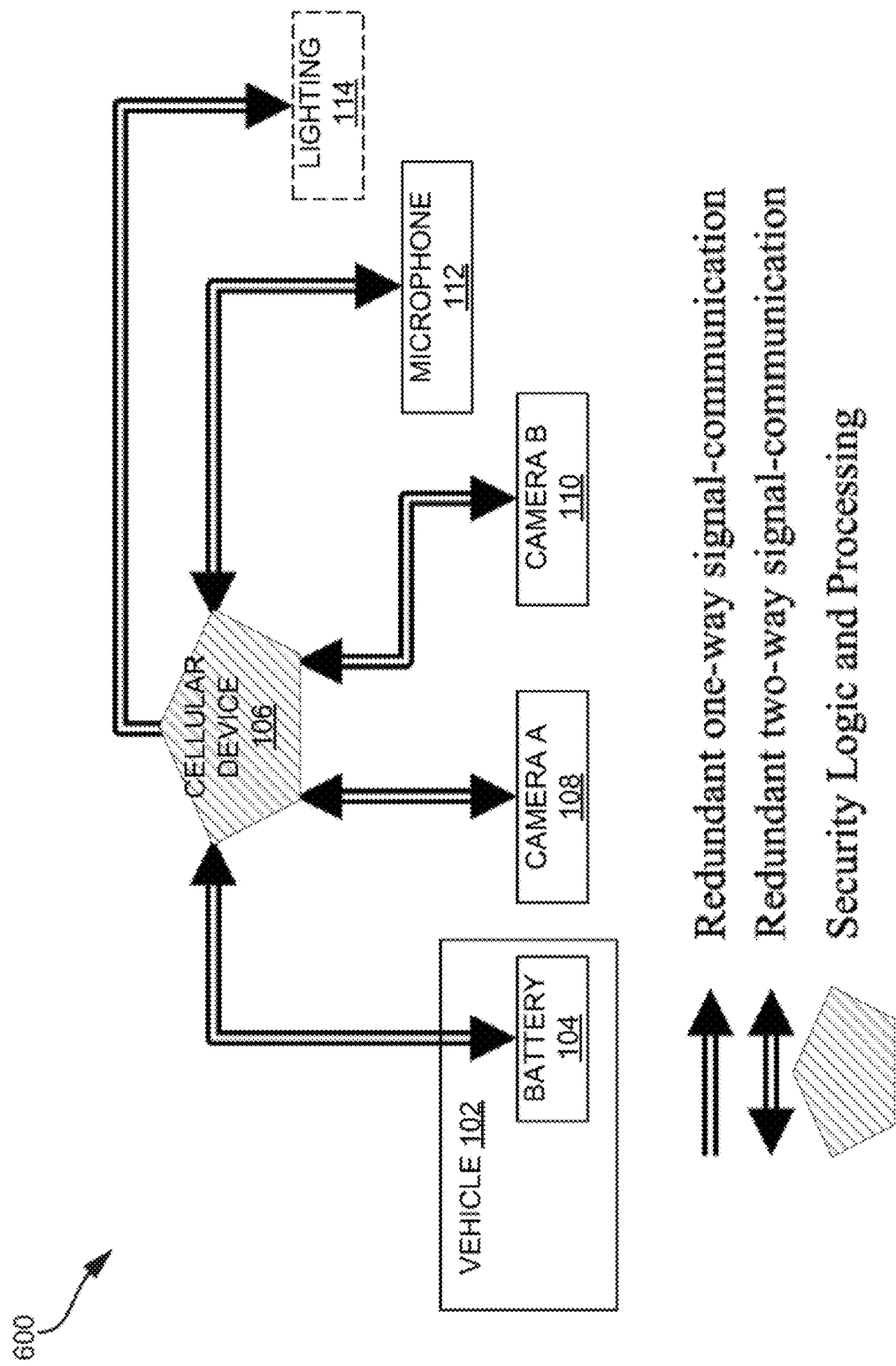
FIG. 6 illustrates another example home security system, according to some examples of the present disclosure.

As illustrated in FIG. 6, security system 600 includes cellular device 106 that performs security logic and processing. The cellular device 106 may communicate, via a redundant two-way signal, with battery 104 of vehicle 102, camera A 108, camera B 110, and microphone 112, and a one-way signal with lighting 114. For example, digital signals may be provided to and from battery 104, camera A 108, camera B 110, microphone 112, and/or optionally lighting 114 (either exclusively to lighting 114 or to and from lighting 114) from cellular device 106. Power may be provided to and from cellular device 106 from battery 104, and power may be then provided from cellular device 106 to and from camera A 108, camera B 110, microphone 112, and/or optionally lighting 114 (either exclusively to lighting 114 or to and from lighting 114). In each instance of passing between components/devices, power may travel through redundant (e.g., multiple) power lines. In some cases, a co-axial cable can be used to help eliminate electromagnetic-noise during the process of transferring power. In some cases, more than one co-axial cable may be required to establish redundancy. In FIG. 6, the security logic and processing can be contained within cellular device 106, which may include a computing processor.

Figure 7:
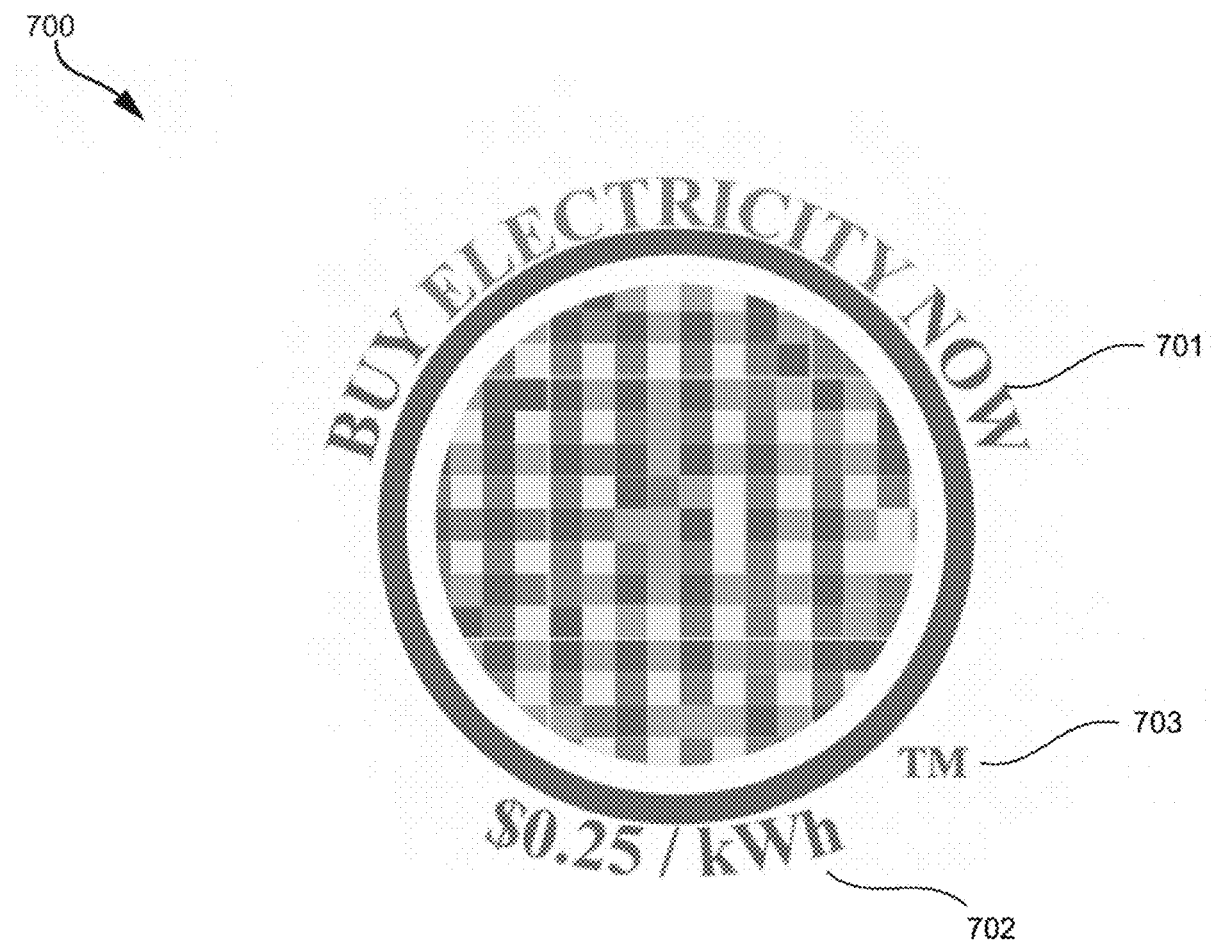
FIG. 7 illustrates an example code for a security system, according to some examples of the present disclosure.

FIG. 7 illustrates an example code that can be used with a security system, according to some examples of the present disclosure. For example, the security system 100 illustrated in FIGS. 1A and 1B can include a range of informative markings, including, without limitations, a bar-code (line-shaped), a QR-code (square-shaped), a Buy-Now code (BN code) (circle-shaped), and/or a time-dependent indicator (TDI). By way of example, FIG. 7 is at least one example of a BN code 700. The BN code 700 can include wording 701 that can be informative, advertisements, a referral link, purchase link, sign-up link, and the like so as to actuate a consumer to a particular source of goods or services (e.g., security plan). In other examples, the BN code 700 can include rates or costs 702 associated with the goods or services. The BN code 700 can take the shape of a word or design trademark 703.

Figure 8:
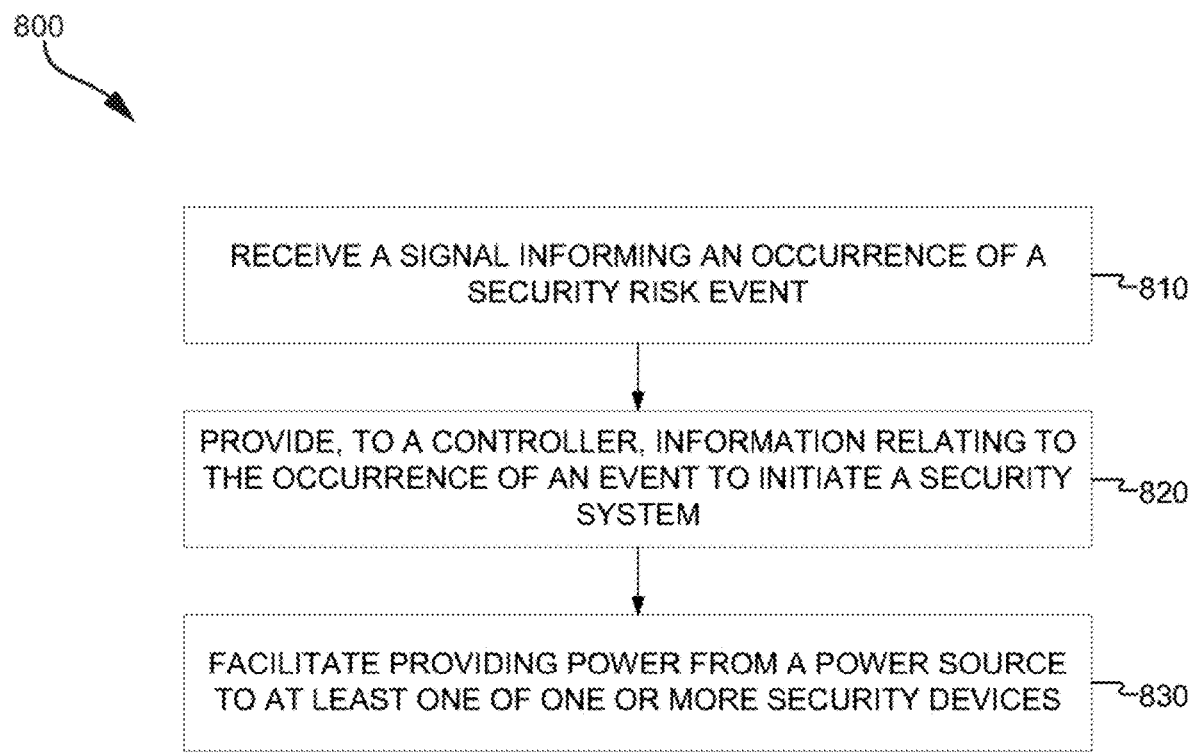
FIG. 8 is a flowchart illustrating an example process for facilitating providing power to security device(s) upon an occurrence of a security risk event, according to some aspects of the disclosed technology.

FIG. 8 is a flowchart illustrating an example process 800 for facilitating providing power to security device(s) upon an occurrence of a security risk event. Although example process 800 depicts a particular sequence of operations, the sequence may be altered without departing from the scope of the present disclosure. For example, some of the operations depicted may be performed in parallel or in a different sequence that does not materially affect the function of process 800. In other examples, different components of an example device or system that implements process 800 may perform functions at substantially the same time or in a specific sequence.

At step 810, process 800 includes receiving a signal informing an occurrence of a security risk event. For example, security system 100 can receive a signal that indicates an occurrence of a security risk event, which may disrupt the performance and/or operation of security device (s). Examples of a security risk event can include, without limitation, a discontinuity, sudden drop, slow drop, and/or sustained drop in power to a home, habitat, dwelling, abode, station, ward, and/or building. Further examples of the event can include, without limitations, power outage, power shortage, power ration, a natural disaster, a test, a power usage schedule, etc.

At step 820, process 800 includes providing, to a controller, information relating to the occurrence of an event to initiate a security system. For example, security system 100 may provide, to a controller, information relating to the occurrence of an event to initiate a security system. The controller can include power source to charge one or more security devices. For example, a controller can include a battery (e.g., battery 104) that may provide power and/or activate one or more security devices. Examples of a security device can include, without limitation, digital cameras (e.g., camera A 108, camera B 110), charge-coupled devices, microphones (e.g., microphone 112), lighting devices (e.g., lighting 114), and home locks (e.g., home locks 116), security devices A-F 202-212, etc.

At step 830, process 800 includes facilitating providing power from the power source to at least one of the one or more security devices. For example, security system 100 may facilitate providing power from a power source (e.g., battery 104) to one or more security devices (e.g., cellular device 106, camera A 108, camera B 110, microphone 112, lighting 114, home locks 116, security devices A-F 202-212, etc.).

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the domains and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   receiving a signal informing an occurrence of a security risk event;
   providing, to a controller comprising logic located within a vehicle battery, information relating to the occurrence of an event to initiate a security system, wherein the controller includes a power source to charge one or more security devices;
   facilitating providing power from the power source to at least one of the one or more security devices; and
   facilitating providing security logic signals from the power source to directly activate at least one of the one or more security devices.

2. The method of claim 1, wherein the power source includes a battery that is affixed to a vehicle.

3. The method of claim 1, wherein the one or more security devices include at least one of a camera, a microphone, a lighting, and a entry door lock.

4. The method of claim 1, wherein providing power from the power source to the at least one of the one or more security devices is based on a predetermined schedule.

5. The method of claim 1, wherein an amount of power to be provided to each one of the at least one of the one or more security devices is predetermined.

6. A security system comprising: one or more security devices;
   a controller comprising logic located within a vehicle battery comprising a power source, the power source configured to provide power to at least one of the one or more security devices and the controller configured to provide security logic signals from the power source to directly activate at least one of the one or more security devices; and
   a communication device configured to receive a signal informing an occurrence of a security risk event and communicate with the controller or the power source upon the occurrence of the security risk event.

\* \* \* \* \*